Jan. 8, 1935.  C. CRETORS  1,987,388
CORN POPPING APPARATUS
Filed Jan. 16, 1934   3 Sheets-Sheet 1
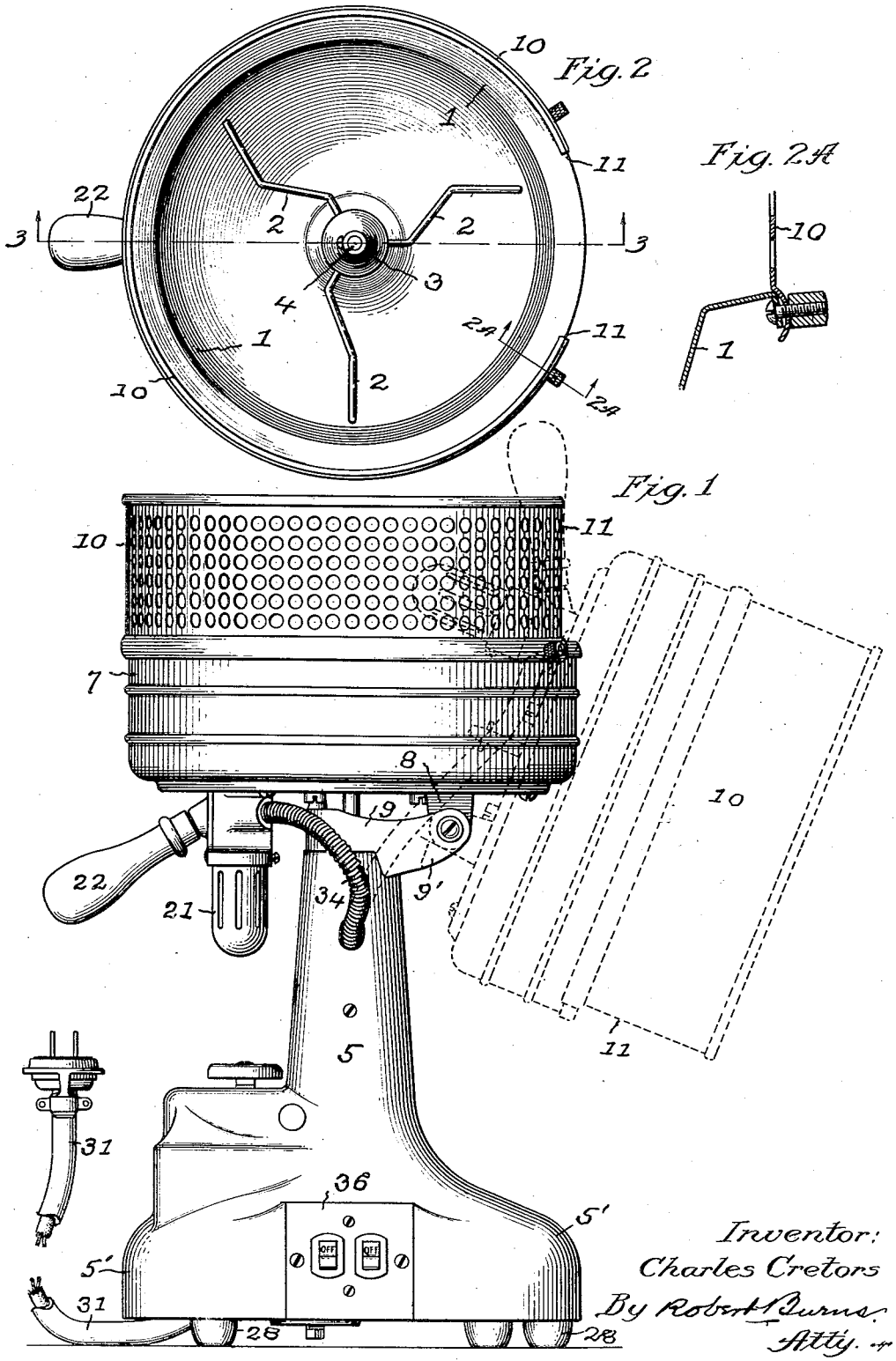
Inventor:
Charles Cretors
By Robert Burns
Atty.

Jan. 8, 1935.  C. CRETORS  1,987,388
CORN POPPING APPARATUS
Filed Jan. 16, 1934  3 Sheets-Sheet 2
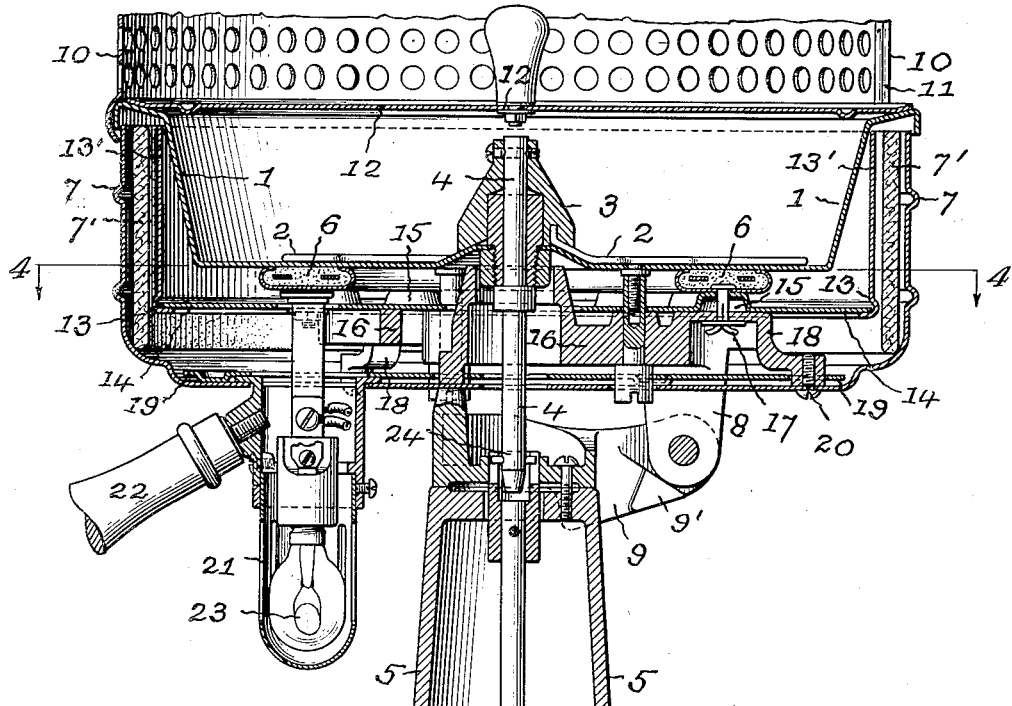
Fig. 3
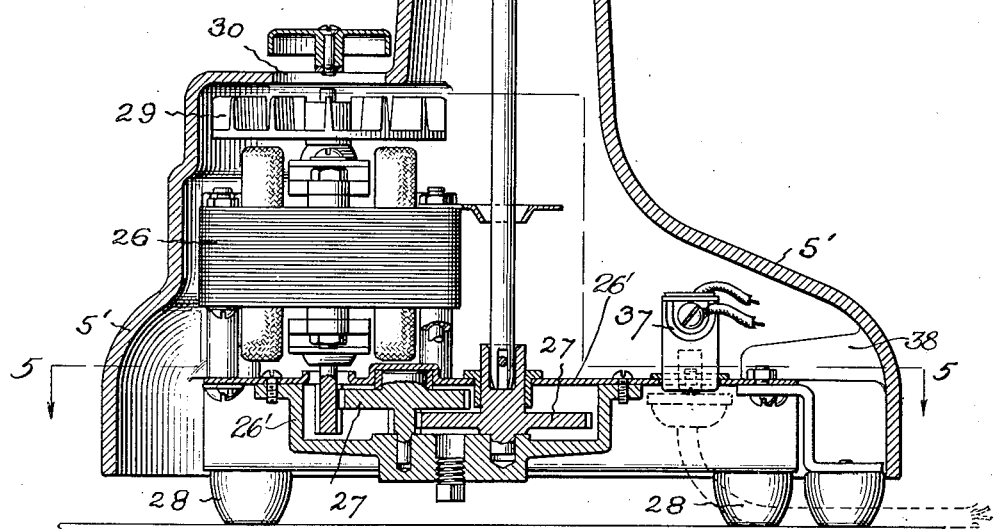
Inventor:
Charles Cretors
By Robert Burnt
Atty.

Jan. 8, 1935. C. CRETORS 1,987,388
CORN POPPING APPARATUS
Filed Jan. 16, 1934 3 Sheets-Sheet 3

Inventor:
Charles Cretors
By Robert Burns
Atty.

Patented Jan. 8, 1935

1,987,388

UNITED STATES PATENT OFFICE 1,987,388

CORN POPPING APPARATUS

Charles Cretors, Chicago, Ill.; Hazael D. Cretors executor of said Charles Cretors, deceased Application January 16, 1934, Serial No. 706,828

4 Claims. (Cl. 53—4)

This invention relates to that type of corn popping apparatus in which the popping pan is provided with a rotary stirring means and with a fixed heating element, preferably of the electrical resistance type, in operative relation to the under side of the pan, and more especially to that type of apparatus in which the combined pan and heating element are pivotally mounted on a stationary supporting pedestal with a view to attain a tilting movement of the popping pan and accessories from a normal vertical operative position to an inclined position to effect a discharge of the contents of the popping pan on the completion of the popping operation. And this improvement has for its various objects:

To provide in connection with the heating unit of the open top popping pan and containing housing of the above mentioned type of apparatus, of means whereby the portions of the heat rays from the heating unit, which ordinarily pass in a direction away from the popping pan are reflected and redirected against the popping pan to assist in heating the same.

To provide a structural formation and combination of parts wherein a hollow supporting pedestal is formed with an expanded footing or base adapted to enclose the operating motor and controlling switches of said motor and other units, with the upper end of the pedestal provided with a laterally extending pivot bracket for the pivotal attachment of the popping pan and its fixed accessories, with a view to a ready and convenient discharge of the contents of the popping pan on the completion of a popping operation.

To provide a like formation and combination of parts in said type of apparatus, comprising the lateral arrangement of an electric motor in the expanded footing of the hollow supporting pedestal of the structure in connection with a centrally arranged vertical drive shaft, from which the stirrer unit of the popping pan is actuated, with said shaft having a sectional formation connected together by a separable clutch connection with a view to permit a dumping movement of the popping pan in a continuous operation of the mechanisms of the apparatus, all as will hereinafter more fully appear.

In the accompanying drawings:—

Fig. 1 is a side elevation illustrating the general arrangement of parts and features of this invention.

Fig. 2 is a detail plan view, with the floating lid or cover of the popping pan removed, so as to disclose the stirring unit.

Fig. 2A is a detail section on line 2A—2A, Fig. 2 of the connection between the upper margin of the popping pan and the reticulated vertical wall extension thereof.

Fig. 3 is a vertical section on line 3—3, Fig. 2.

Like reference numerals indicate like parts in the several views.

Figure 4:
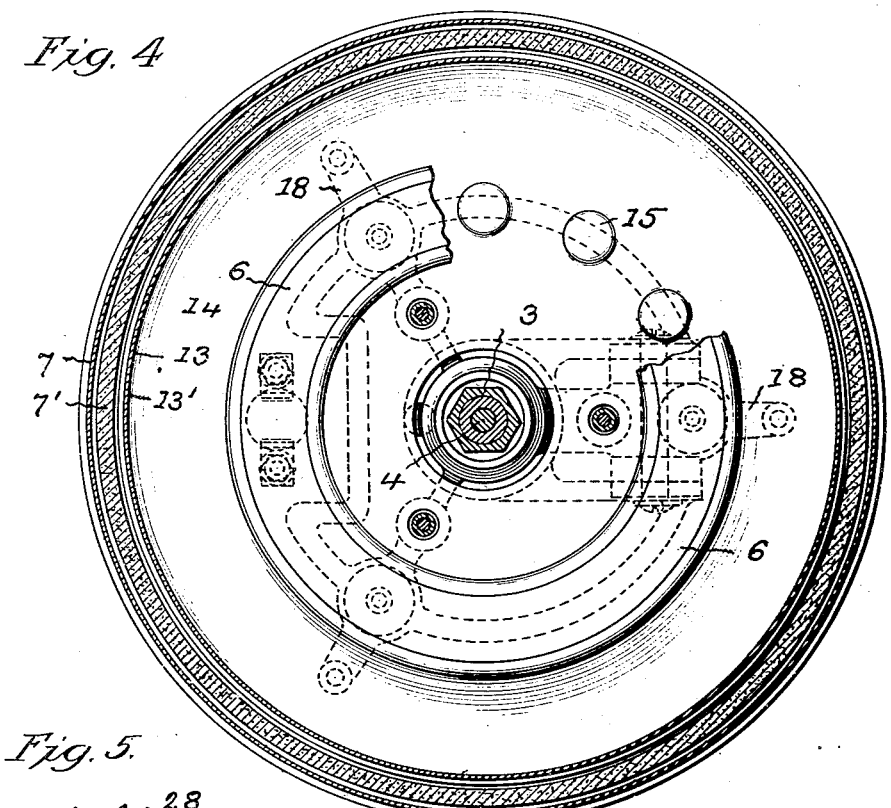
Fig. 4 is a horizontal section on line 4—4, Fig. 3, illustrating the electrical heating unit and accessories of the apparatus.
Figure 5:
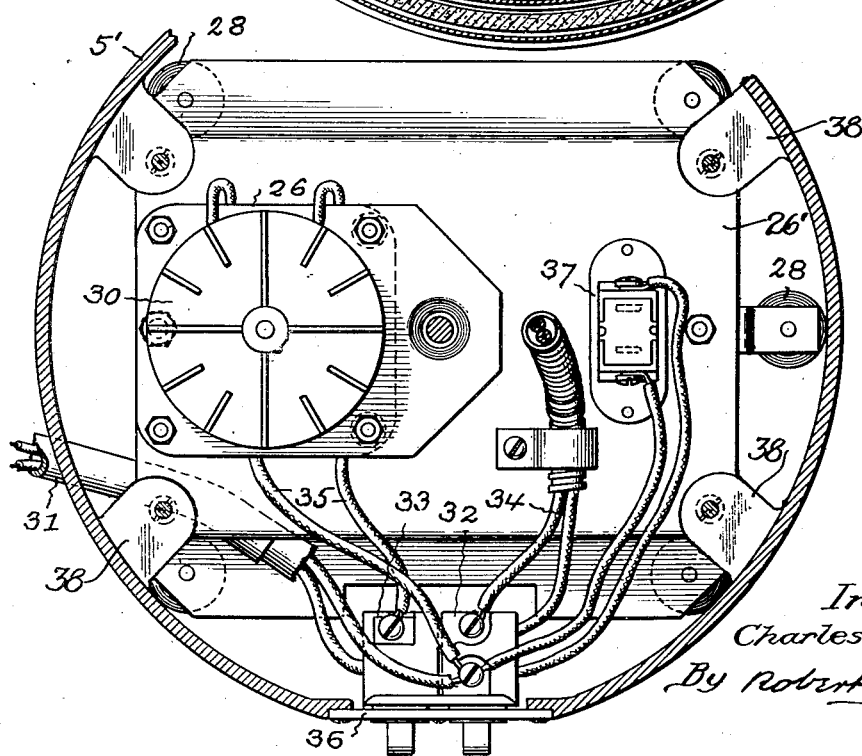
Fig. 5 is a similar view on line 5—5, Fig. 3, illustrating the electrical connections of the different units of the apparatus.

In this improvement the popping pan 1, as in my prior Patent No. 1,729,866, dated Oct. 1, 1929, is of an open top and flat bottom formation, provided with stirring rods or blades 2 extending from a central hub 3, the carrying shaft 4 of which depends below the bottom wall of the popping pan, and in this improvement is operatively connected in the detail manner hereinafter described with a driving motor arranged in the hollow supporting pedestal 5 of the present construction. While in contact with the bottom wall of the popping pan 1, an annular electrical heating unit 6 is attached, the above described parts being enclosed in a containing housing 7, preferably of a heat insulating formation embracing a lining 7' of heat insulating material on the face of the vertical wall of the housing as shown in Fig. 3. And in the construction shown, the containing housing 7 carries a depending pivot lug 8 the lower end of which has pivotal connection with a laterally extending pivot bracket 9 on the upper end of the supporting pedestal 5, with said bracket provided with a stop or abutment lug 9' adapted to stop and hold the popping pan 1 and fixed accessories in a proper downwardly tilted condition for a discharge of the popped material on the completion of the popping operation.

A material feature of this improvement involves a central wall extension 10 at the open top of the popping pan 1 of a reticulated or perforated formation, with a portion of its wall cut away to provide a lateral passage 11 for the outlet of popped corn, as the same, due to its expansive nature, moves up from the popping pan during the popping operation.

In connection with the above described lateral passage 11 in the wall 10, this improvement involves the provision of a floating cover plate 12 formed to loosely fit the chamber within said wall and adapted to freely rise with the above mentioned expansion of the popping corn and permit a discharge of the same through the passage 11 into a suitable receptacle provided at the side of the apparatus. In the preferred construction shown in Fig. 3, the cover plate 12 depends solely for guidance on the inner face of the wall 10; it is, however, within the scope of the invention to provide additional guiding means such as the central guide stem 25 of my aforesaid Patent No. 1,729,866.

Another material feature of this improvement involves the provision of a sheet metal reflector 13, preferably of the open top pan form shown in Fig. 3, and having spaced relation to the side wall of the popping pan 1 and like spaced relation below the bottom wall of the popping pan and below the heating unit 6 aforesaid. Said sheet metal reflector 13 is preferably formed of polished sheet aluminum, which has been found very suitable in affording an effective heat reflection action in directing the heat prevailing in the containing housing 7 to and against the wall of the popping pan 1 to aid materially in maintaining the same in a properly heated condition. In the preferred construction shown in Fig. 3, the reflector 13 is shown as formed of two separate members, to wit: a vertical circular wall 13' and a disk like bottom member 14 secured together at their meeting point in order to admit of the vertical wall 13' being removed and dispensed with, in a simpler and cheaper form of the apparatus.

In the construction shown, the containing housing 7, the electric heating unit 6 and the heat reflector 13 and the bottom wall of the housing are fixedly connected together, while the popping pan 1 and its perforated wall extension 10 are connected as a unit and are adapted removably to fit and be supported by the upper marginal portion of the containing housing 7 in proper operative relation to the aforesaid heating unit 6, for convenient inspection and repair of the parts.

Spaced relation between the heating unit 6 and the bottom plate 14 of the reflector 13 is attained by a plurality of upstanding projections 15 on said bottom plate, with the parts secured together to an underlying spider 16, now to be described, by fastening bolts 17, as shown.

The spider 16 above referred to, is provided with depending legs 18 adapted for supporting contact with the bottom wall of the containing housing 7 in order to provide a heat insulating space between the parts, and in the construction shown, such space is subdivided by an intermediate plate or partition 19 in spaced relation to the parts secured together by screws 20.

Near its margin the bottom plate of the containing housing 7 is provided with a depending shell or casing 21 having a handle 22 for effecting a convenient tilting movement of the popping pan and its accessories, with said shell or casing carrying a signal light 23 in circuit with the heating unit 6 of the popping pan 1 to indicate the active and inactive condition of said heating unit.

The shaft 4 of the stirrer mechanism, above referred to, extends downward to a point on a horizontal plane with the heretofore described pivotal connection between the popping pan and its supporting pedestal and at its lower end carries one member of a separable clutch device 24.

A driving shaft section 25, in longitudinal axial relation to the shaft 4 just referred to, carries at its upper end the other member of the clutch 24, by which operative connection between the same is effected. Said driving shaft section 25 is arranged centrally in the hollow supporting pedestal 5, with its lower end in operative engagement with the armature shaft of an electric motor 26, by a train of speed reducing gear wheels 27. Said motor 26 being positioned laterally in the enlarged footing or base 5' of the hollow supporting pedestal 5 aforesaid.

In the construction shown the electric motor 26, and associated mechanisms, are mounted on sole plate or base member 26', which in turn is detachably secured to the under faces of a series of inwardly extending bracket lugs 38 on the inner face of the hollow base 5 of the supporting pedestal 5 of the apparatus.

With a view to effective ventilation of the electric motor 26 and mechanisms associated therewith, the pedestal 5 is supported a distance above the surface on which the apparatus rests, by means of a plurality of short supporting feet 28, attached to the underside of the aforesaid sole plate or base 26'. By such arrangement external air is permitted to freely pass into the interior of the open bottom pedestal 5 to maintain a properly cooled condition of the electric motor 26 and other parts arranged in the interior of the pedestal.

The circulation of external air through the hollow pedestal 5, is materially aided by a rotary fan 29 carried on the upper end of the armature shaft of the electric motor 26, with such fan arranged in adjacent relation to an exit opening 30 in the wall of the expanded base 5' of said pedestal.

The electric circuit of the apparatus comprises a lead-in cable 31 extending into the interior of the hollow pedestal 5, with its conducting wires connected to a double pole switch 32 and a single pole switch 33 with said double pole switch 32 having line connections 34 with the electric heating unit 6 of the popping pan, and with the single pole switch 33 having line connections 35 with the electric motor 26 aforesaid.

In the construction shown, the face plate 36 carrying the aforesaid switches also carries their manual operating means, and is secured in an opening in a vertical wall of the footing or base of the supporting pedestal for convenience in manipulation, etc.

For convenient association of the present apparatus with the heating means of a storage receptacle for the popped corn as it comes from the present apparatus, what is known in the electrical art as a "convenience outlet" 37 is mounted within the pedestal base 5 and connected with the terminals of the double pole switch 32 and is embraced in the circuit of the electric motor 26.

Having thus fully described my invention what I claim as new, is:

1. In a corn popping apparatus, the combination of a hollow supporting pedestal having an expanded base, an open top popping pan, a heating unit in operative relation to the bottom wall of said pan, a stirrer mechanism in said pan, a wall extension secured to the margin of the popping pan and formed with a passage at one side, and a cover arranged in the interior of said wall extension and having a free floating movement vertically in the interior of said wall extension, the popping pan, the heating unit and the stirring mechanism forming an assembled unit and as a whole are pivotally mounted on the upper end of the pedestal by a lateral hinge extension to provide for a tilting operation of the popping pan and its accessories.

2. In a corn popping apparatus the combination of an open top popping pan, a heating unit in operative relation to the bottom wall of said pan, a containing housing for said pan and heating unit and a reflector plate of polished metal arranged in spaced relation beneath said heating unit and adapted to reflect heat in the direction of the popping pan, said reflector plate being provided with a marginal extension adapted to enclose the popping pan.

3. A corn popping apparatus as specified in claim 2, and wherein the reflector plate is supported by a spider having depending feet imposing spaced relation between said plate and the bottom wall of the containing housing to provide an insulating air space between the parts, with said space provided with an intermediate plate partition.

4. In a corn popping apparatus, the combination of an open top popping pan, a heating unit in operative relation to the bottom wall of said pan, a containing housing for said pan and heating unit, a supporting pedestal having lateral pivotal connection with said containing housing, an electric motor and its armature shaft having a vertical arrangement in the interior of the base of said pedestal, a drive shaft arranged centrally in said pedestal in parallel relation to the armature shaft of the motor, and having speed reducing gear wheel connection of the spur tooth type with said motor, the upper end of said shaft having one member of a separable clutch connection, a stirring mechanism in the popping pan having a central driven shaft the lower end of which carries the other member of said clutch connection, and adapted to permit of a tilting movement of the popping pan, containing housing and associated parts in a final step in operation of the apparatus, and wherein the supporting pedestal is formed with an open bottom base provided with supporting legs and with an upper outlet orifice, the motor being arranged in said base and carrying a ventilating fan in aligned relation with said outlet orifice.

CHARLES CRETORS.